US008036210B2

(12) United States Patent
Zhu et al.

(10) Patent No.: US 8,036,210 B2
(45) Date of Patent: Oct. 11, 2011

(54) METHOD FOR PROVIDING ON-LINE CHARGING AND DEVICE AND SYSTEM THEREOF

(75) Inventors: Dongming Zhu, Shenzhen (CN); Xiaoqin Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 559 days.

(21) Appl. No.: 12/042,952

(22) Filed: Mar. 5, 2008

(65) Prior Publication Data

US 2008/0205381 A1    Aug. 28, 2008

Related U.S. Application Data

(63) Continuation of application No. PCT/CN2006/002595, filed on Sep. 30, 2006.

(30) Foreign Application Priority Data

Oct. 5, 2005   (CN) .......................... 2005 1 0106572

(51) Int. Cl.
    *H04L 12/66*   (2006.01)
(52) U.S. Cl. ....................................... 370/352; 370/356
(58) Field of Classification Search .................. 370/352, 370/356; 379/114.01, 114.22, 114.29
    See application file for complete search history.

(56) References Cited

U.S. PATENT DOCUMENTS

| 7,599,478 | B2 * | 10/2009 | Cai et al. | 379/114.21 |
| 7,742,763 | B2 * | 6/2010 | Jiang | 455/433 |
| 2003/0027569 | A1 | 2/2003 | Ejzak | |
| 2003/0027595 | A1 | 2/2003 | Ejzak | |
| 2003/0031160 | A1 * | 2/2003 | Gibson Ang et al. | 370/349 |
| 2004/0013257 | A1 * | 1/2004 | Oikawa et al. | 379/211.02 |
| 2004/0185826 | A1 * | 9/2004 | Koskinen et al. | 455/406 |
| 2007/0058788 | A1 * | 3/2007 | Mahdi et al. | 379/88.17 |
| 2007/0189300 | A1 | 8/2007 | Bellora et al. | |
| 2008/0062966 | A1 * | 3/2008 | den Hartog et al. | 370/352 |

(Continued)

FOREIGN PATENT DOCUMENTS

CN    1454014 A    11/2003

(Continued)

OTHER PUBLICATIONS

"$3^{rd}$ Generation Partnership Project; Technical Specification Group Services and System Aspects; Voice Call Continuity Between CS and IMS Study (Release 7)," *3GPP*, 1-116 (Jul. 2005).

(Continued)

*Primary Examiner* — Huy Vu
*Assistant Examiner* — Omer Mian
(74) *Attorney, Agent, or Firm* — Leydig, Voit & Mayer, Ltd.

(57) ABSTRACT

The present invention discloses a method for providing an online-charging to solve a problem that a related charging can not be processed correctly for a service involving simultaneously a CS domain and an IMS. The method includes: not invoking an online charging for the user in the CS domain when the user, who subscribes for the service involving simultaneously the CS domain and the IMS and the online charging service, originates or terminates a call in the CS domain; and performing the credit control in the CS domain and/or the IMS for the user in the IMS when the call of the user is processed through the IMS. The present invention also discloses a device and a system for an online credit control.

28 Claims, 10 Drawing Sheets

U.S. PATENT DOCUMENTS

2010/0034166 A1* 2/2010 Olvera-Hernandez ........ 370/331

FOREIGN PATENT DOCUMENTS

| CN | 1477883 A | 2/2004 |
|---|---|---|
| WO | WO 2005/027408 A1 | 3/2005 |

OTHER PUBLICATIONS

"Digital Cellular Telecommunications System (Phase 2+); Universal Mobile Telecommunications System (UMTS); Telecommunication Management; Charging Management; Charging Principles (3GPP TS 32.200 version 5.9.0 Release 5)," *ETSI Standards*, 3-SA5 (V.5.9.0), 1-92 (Sep. 1, 2005).

"Digital Cellular Telecommunications System (Phase 2+); Universal Mobile Telecommunications System (UMTS); Telecommunication Management; Charging Management; Charging Data Description for the IP Multimedia Subsystem (IMS) (3GPP TS 32.225 version 5.9.0 Release 5)," *ETSI Standards*, 3-SA5 (V.5.9.0), 1-69 (Sep. 1, 2005).

"Digital Cellular Telecommunications System (Phase 2+); Universal Mobile Telecommunications System (UMTS); Telecommunication Management; Charging Management; Online Charging System (OCS): Applications and Interfaces (3GPP TS 32.296 version 6.2.0 Release 6)," *ETSI Standards*, 3-SA5(6.2.0), 1-65 (Sep. 1, 2005).

Miladinovic et al., "Intelligent Network Services in the Time of Network Migration," *Telecommunications Network Strategy and Planning Symposium (11$^{th}$ International, Vienna, Austria)*, 33-38 (Jun. 13, 2004).

State Intellectual Property Office of the People's Republic of China, Examination Report in Chinese Patent Application No. 2006800119245 (May 15, 2009).

European Patent Office, Examination Report in European Patent Application No. 06791181.8 (Nov. 5, 2009).

European Patent Office, Examination Report in European Patent Application No. 06791181.8 (Jul. 13, 2010).

State Intellectual Property Office of the People's Republic of China, English Translation of Written Opinion of the International Searching Authority in International Patent Application No. PCT/CN2006/002595 (Feb. 8, 2007).

Global System for Mobile Communications, "Customised Applications for Mobile Network Enhanced Logic (CAMEL) Phase 4; Stage 2 (Release 7)," 3$^{rd}$ Generation Partnership Project; Technical Specification Group Core Network; 3GPP TS 23.078 V7.0.0 (Jun. 2005).

Global System for Mobile Communications, "Overall High Level Functionality and Architecture Impacts of Flow Based Charging; Stage 2 (Release 6)," 3$^{rd}$ Generation Partnership Project; Technical Specification Group Services and System Aspects; 3GPP TS 23.125 V6.6.0 (Sep. 2005).

Global System for Mobile Communications, "IP Multimedia Subsystem (IMS); Stage 2 (Release 7)," 3$^{rd}$ Generation Partnership Project; Technical Specification Group Services and Aspects; 3GPP TS 23.228 V7.0.0 (Jun. 2005).

Global System for Mobile Communications, "Customised Applications for Mobile Network Enhanced Logic (CAMEL) Phase 4; Stage 2 IM CN Interworking (Release 6)," 3$^{rd}$ Generation Partnership Project; Technical Specification Group Core Network and Terminals; 3GPP TS 23.278 V6.1.0 (Jun. 2005).

Global System for Mobile Communications, "Voice Call Continuity Between CS and IMS Study (Release 7)," 3$^{rd}$ Generation Partnership Project; Technical Specification Group Services and System Aspects; 3GPP TR 23.806 V1.5.1 (Aug. 2005).

Global System for Mobile Communications, "IP Multimedia Subsystem (IMS) Charging (Release 6)," 3$^{rd}$ Generation Partnership Project; Technical Specification Group Service and System Aspects; Telecommunication Management; Charging Management; 3GPP TS 32.260 V6.2.0 (Jun. 2005).

Global System for Mobile Communications, "Online Charging System (OCS): Applications and Interfaces (Release 6)," 3$^{rd}$ Generation Partnership Project; Technical Specification Group Service and System Aspects; Teleconnunication Management; Charging Management; 3GPP TS 32.296 V6.1.0 (Jun. 2005).

Global System for Mobile Communications, "Charging Data Record (CDR) Parameter Description (Release 6)," 3$^{rd}$ Generation Partnership Project; Technical Specification Group Service and System Aspects; Telecommunication Management; Charging Management; 3GPP TS 32.398 V.6.0.0 (Jun. 2005).

* cited by examiner

METHOD FOR PROVIDING ON-LINE CHARGING AND DEVICE AND SYSTEM THEREOF

CROSS-REFERENCE TO RELATED APPLICATIONS

The present application is a continuation of PCT application PCT/CN2006/002595, filed on Sep. 30, 2006, entitled "A METHOD FOR PROVIDING ON-LINE CHARGING AND A DEVICE AND A SYSTEM THEREOF", which claims priority to Chinese Patent Application No. 200510106572.9, filed Oct. 5, 2005, both of which is incorporated by reference herein in its entirety.

FIELD OF THE INVENTION

The present invention relates to the field of communication technologies, and in particular to a method, device and system for providing an online charging.

BACKGROUND OF THE INVENTION

Since the 3rd Generation Partnership Project Release 5 (3GPP R5), a Universal Mobile Telecommunication System (UMTS) core network is divided into three subsystems including a Circuit Switched (CS) domain, a Packet Switched (PS) domain and an Internet Protocol Multimedia Subsystem (IMS). The CS domain is used for providing users with connections of circuit switched services, the PS domain is used for providing users with connections of packet switched services, and the IMS is a subsystem superimposed over the existing PS domain in the 3GPP R5. The IMS employs the PS domain as a bearer channel for the transmission of the upper layer control signaling and media data, introduces a Session Initial Protocol (SIP) as a service control protocol and provides abundant multimedia services for users by separating the service control and the bearer control and utilizing the characteristics of the SIP, i.e., simply, extensible and convenient for media combination.

Primary function entities in the IMS include: a Call Session Control Function (CSCF), configured to perform a user registration control, a session control and so on; an Application Server (AS), configured to provide various service logical control; a Home Subscriber Server (HSS), configured to manage subscription data of a user in a centralized manner; and a Media Gate Control Function (MGCF)/IMS Media Gateway (IM-MGW), configured to enable the interworking with a circuit switched network. A user may connect to the IMS through a Proxy-CSCF (P-CSCF) in the visited network, then session control, service triggering control and service control interaction with an AS are performed by the serving-CSCF (S-CSCF) of the home network.

The IMS architecture defined by the 3GPP solves all the key operability problems required for providing multimedia services over an IP bearer, such as roam charging, Quality of Service (QoS) and security guarantee, and has been accepted universally in the industry. Both the 3GPP2 and the Telecommunications and Internet converged Services and Protocols for Advanced Networking (TISPAN) define IP multimedia network architectures and service systems based upon the 3GPP model. Also, the 3GPP has started researches on the interworking of Wireless Local Area Network (WLAN) access with 3GPP system (I-WLAN), Fixed Broadband IMS (FBI) access, and the all-IP network (AIPN) supporting multiple access technologies. A user may be enabled to connect to the IMS according to the subscription of the user though access networks of different access technologies via a single multi-mode terminal or various types of terminals, so as to obtain uniform multimedia services, including a Voice over IP (VoIP) service. The above researches may possibly be related to a service involving the CS domain and the IMS simultaneously.

Particularly, the 3GPP Release 7 approves a work item to research on the issue of service continuity between a CS call and an IP-borne VoIP service provided by the IMS, while the IMS may be accessed though the WLAN or other IP access networks, i.e., a work item of Voice Call Continuity (VCC), including a research on a method for supporting a domain transfer between the CS call and the VoIP service provided by the IMS, so that the VCC may be achieved to accommodate the demands of network and service developments. The VCC service is a representative of services involving the CS domain and the IMS simultaneously.

In the development of 3GPP VCC, there is proposed a static anchoring and IMS centralized control method for the domain transfer. The basic idea lies in that, in the IMS home domain, the VCC user is assigned with an AS as a Call Continuity Control Function (CCCF), and control signaling of all the correlated CS calls and IMS sessions of the VCC user are routed to the AS for anchoring. The CCCF controls the above communication connection between the VCC user and a corresponding opposite user in a Third-party Call Control (3PCC) mode and accomplishes the domain transfer in accordance with a request from the VCC user. In other words, the communication connection between the VCC user and the opposite user is divided into two segments on the AS. When the VCC user decides to perform the domain transfer, the VCC user initiates to establish a connection to the AS in a transfer-in network domain. After the establishment of the new connection, the AS controls a renegotiation on the connection to the opposite user, so as to make the opposite user continue the voice communication with the VCC user over the new connection. As illustrated in FIG. 1, a CCCF controls the replacement of the two connections with the VCC user.

FIG. 2A, FIG. 2B and FIG. 2C illustrate procedures for establishing signaling and bearer connection during a domain transfer procedure from the CS domain to the IMS and a subsequent domain transfer procedure from the IMS to the CS domain for a CS originating call in the prior art. By the procedure, problems confronted by an online charging (or referred as a real-time charging) mode and a prepay service applying the online charging mode during a processing of a service simultaneously involving the CS domain and the IMS, may be shown.

Particularly, FIG. 2A illustrates a procedure for establishing signaling and bearer connection for a CS domain originating call before performing a VCC domain transfer from the CS domain to the IMS. In this procedure, the CS originating call of a VCC user is routed to a CCCF of the home IMS of the user for anchoring, and a bearer connection including a segment of CS bearer and a segment of IP bearer, segmented by an IM-MGW, are established between the VCC user and the opposite user (in FIG. 2A, it is assumed that the opposite side is at the IMS, and if the opposite user is at the PSTN, the connection from the CCCF to the opposite side may further go through an MGCF) as following.

1. The VCC user initiates a call in the CS domain at a Visited Mobile Switching Center (VMSC) in which the VCC user currently registers.

2. The VMSC triggers an originating side intelligent service in accordance with the subscription data of the VCC user, and sends an Initial Detection Point (IDP) message toward a GSM Service Control Function (gsmSCF) responsible for originating side's routing controlling.

3. The gsmSCF responsible for originating side's routing controlling returns a virtual roaming number pointing to the VCC user's home IMS, i.e., an IP Multimedia Routing Number (IMRN), through a Connect message, and in accordance with the Connect message, the VMSC routes the CS originating call to the CCCF assigned for the VCC user through other network elements in the CS domain, a CS/IMS interworking gateway MGCF and IMS-related network elements, and with the MGCF performing a CS-IMS interworking and converting the CS call to an IMS session, finally establishes a CS-IMS interworking session (dependent upon the IMRN, there may be actually different processing in the IMS, but this is not the focus of the present invention; as illustrated in the flow chart in FIG. 2, the IMRN includes a Public Service Identity (PSI) pointing to the CCCF, and the IMS-related network elements include an Interrogating-CSCF (I-CSCF)).

4. The CCCF terminates the received session as a final called party, interacts with the HSS to obtain the S-CSCF assigned for the VCC user (not illustrated), and then in accordance with information carried in the received session establishment request, reinitiates another segment of the session to the original opposite user on behalf of the VCC user through the S-CSCF, and correlatively controls the establishment of the two segments of the session in a 3PCC (also referred to as Routing Back-to-Back User Agent, i.e., Routing B2BUA) way.

5. Finally, the CS-IMS interworking session from the VCC user to the CCCF of the VCC user's home IMS domain via the CS domain and the CS-IMS interworking gateway, and the session from the CCCF to the opposite user are established, and the CCCF correlatively controls the two segments of the session to establish the bearer connection including a segment of CS bearer and a segment of IP bearer, segmented by an IM-MGW.

FIG. 2A illustrates merely one of implementations for anchoring the initial CS originating call to the CCCF in the user's home IMS. Alternatively, the user may directly insert a prefix to a called number or use a specific number pointing to the user's home IMS as the called number in the originated call, and the VMSC controls routing in accordance with the prefix or the specific number. Meanwhile, the number or the IMRN as described above may directly point to the CCCF as illustrated in FIG. 2, or may point to another AS. If the number or the IMRN points to another AS, the AS interacts with the HSS to obtain the S-CSCF currently assigned for the user and reinitiates a session to the original opposite user on behalf of the served user in accordance with the information carried in the received session establishment request, and then the S-CSCF triggers the session to the CCCF in accordance with an initial Filtering Criterion (iFC) in the IMS subscription data of the user, and so on. These are not the focuses of the present invention, and will not be described hereinafter.

Moreover, FIG. 2A illustrates a procedure for anchoring the initial CS originating call to the user's CCCF in the prior art. In addition, a procedure for anchoring an initial CS terminating call to the user's CCCF is also proposed in the prior art. As an alternative, a Gateway Mobile Switching Center (GMSC) in a called user's home PLMN receives a call establishment request destined to the user, interacts with an Home Location Register (HLR) to obtain terminating side CAMEL subscription data of the user, triggers a terminating side intelligent service in accordance with the data, and interacts with a gsmSCF responsible for terminating side's routing controlling to obtain an IMRN pointing to the home IMS. The GMSC, a CS/IMS interworking gateway MGCF and IMS-related network elements route the CS-IMS interworking session to the CCCF assigned for the user for anchoring in accordance the above information. Subsequently, through various processing in the prior art, such as a domain selection, call interworking and CS call delivery, the call is delivered to the user's VCC terminal, then the CS-IMS interworking session between the VCC user and the CCCF in the VCC user's home IMS domain via the CS domain and the CS-IMS interworking gateway, and the CS-IMS interworking session between the CCCF and the opposite user via the IMS-related network elements, the CS-IMS interworking gateway MGCF and the CS domain are established, and the CCCF correlatively controls the two segments of session to establish the bearer connection including two segments of CS bearer and a segment of IP bearer, respectively segmented by the IM-MGW on the both sides. Similar, these are not the focuses of the present invention, and will be not described hereinafter.

With reference to FIG. 2B, after anchoring the initial CS originating call or terminating call to the CCCF, the user initiates a CS-to-IMS domain transfer as follows.

1. When determining to perform a domain transfer to the IMS, if no IMS registration has been performed, the terminal firstly accomplishes an IMS registration (not illustrated), and then initiates an IMS originating session establishment request to the CCCF carrying information of the initial session, where a CCCF PSI carried therein is used as a domain transfer indication for requesting the CCCF to perform an operation of domain transfer for the currently established CS domain call to the IMS.

2. The S-CSCF assigned for the user routes the session establishment request to the CCCF in accordance with an iFC in user's subscription data.

3. The CCCF executes an SIP session transfer procedure for replacing the CS access leg of the user with an IMS access leg, accomplishes a redirection of a media stream interaction through UPDATE or re-INVITE over the segment of session with the opposite end, thus an end-to-end IP bearer connection between the opposite user and the VCC user is established.

4. Upon successfully performing the transfer of the SIP session, the signaling and bearer connection corresponding to the CS access leg of the VCC user is released.

With reference to FIG. 2C, a procedure for establishing a signaling and bearer connection during a subsequent domain transfer back to the CS domain is as follows.

1. After determining that it is needed to perform a VCC domain transfer back to the CS domain, if no registration has been performed at the VMSC, the terminal firstly registers at the VMSC (perform CS domain Location Updating, not illustrated), and then initiates a CS originating call to the CCCF, with a CCCF PSI carried therein as a domain transfer indication for requesting the CCCF to execute an operation of domain transfer back to the CS domain. The CS originating call is routed to the CCCF via an MGCF and an I-CSCF or S-CSCF.

2. The CCCF performs an SIP session transfer procedure similar to that described above for replacing the IMS access leg of the user with the CS access leg.

3. After successfully performing the SIP session transfer for replacing the IMS access leg with the CS access leg, the signaling and bearer connecting corresponding to the IMS access leg of the VCC user is released.

It shall be noted that the subsequent VCC domain transfer from the IMS to the CS domain has been described as an example in the above descriptions, but actually, the procedure of initial domain transfer from the IMS to the CS domain is the same as the procedure of subsequent domain transfer back to the CS domain, in other words, a history of the domain transfer need not be learned for the control of the CCCF.

Furthermore, similar to the procedure of establishing the CS originating call as illustrated in FIG. 2A, there may be different alternatives for the VCC terminal to establish a new CS access leg between the VCC terminal and the CCCF, including: the terminal directly initiates a call to a specific number, IMRN, which points to the user's home IMS and is indicated as a domain transfer request; or, the terminal initiates a call to a specific number indicated as a domain transfer request, the VMSC where the terminal is located triggers an originating side intelligent service in accordance with user's subscription data, and interacts with a gsmSCF responsible for originating side's routing controlling to obtain the IMRN pointing to the home IMS; and the VMSC, other network elements in the CS domain, the CS/IMS interworking gateway MGCF and IMS-related network elements route the CS-IMS interworking session to the CCCF assigned for the user in accordance the above information. FIG. 2C illustrates merely one of the simplest and most efficient approaches. Similarly, these are not the focuses of the present invention, and will not be described hereinafter.

It may be seen that in such a solution of implementing the Voice Call Continuity, a great influence may be introduced on charging based upon a call connection: for an initial CS call with the VCC user as a calling or called user, since it needs to be routed to the user's home IMS, a call connection will be established through both the CS domain and the IMS before domain transfer, resulting in repetitive charging for this period of time; and for one communication with the opposite user, during the procedure of domain transfer, the user will initiate the establishment of a call connection with the CCCF alternately in the IMS and in the IMS plus the CS domain, which make it difficult to form a complete charging record. Furthermore, in accordance with the current charging criterion, the charging for several communications with short duration is usually different from the charging for one communication with a long duration even with the same total duration. Consequently, even without consideration of the repetitive charging during the domain transfer, it is difficult for the method of separate charging in the CS domain and the IMS to guarantee completeness and accuracy of the charging. Also, since differences may usually exist in the case of establishing a call connection in different network domains and in the case of the user being a calling or a called user, a more flexible charging criterion may be desirable for such a scenario where two network domains are used dynamically and flexibly to establish and maintain a call connection. Furthermore, in the solution for Voice Call Continuity, regardless of the VCC user previously being a calling or a called user to establish the initial communication with the opposite user, the call connection between the VCC user and the CCCF newly established during domain transfer is always established by the VCC user in an originating way. Therefore for guaranteeing completeness and accuracy of the charging, a correct call direction has to be confirmed firstly, and the charging will be performed in accordance with the correct call direction. Obviously from the above, during such processing of a service which involves simultaneously the CS domain and the IMS, in order to implement a correct charging, the whole charging procedure may be very complicated. Particularly, if the method for separate CS domain and the IMS charging is still adopted, an essential requirement for implementation of complete and accurate charging is that a charging correlation in the CS domain and the IMS parts shall be guaranteed, and furthermore, a corresponding processing performed on information of the two correlated parts shall be guaranteed in the charging.

Further, there also exists a real-time charging or online charging mode in current networks, and services which adopt this mode include a prepay service widely applied. A basic feature of the prepay service is that, there is no long term credit relationship between a user and a network, the user prepays some fees and the network performs an online credit control while providing a service, in other words, a real-time deduction of a required fee, and when the prepay fees are exhausted, the provision of the service for the user is terminated.

In the current CS domain, the prepay service is typically based upon the Customized Application of Mobile Network Enhanced Logic (CAMEL) architecture, a primary procedure of the CAMEL is as follows: when the user originates or terminates a CS call, as the gsmSSF, a VMSC where the user is currently located (in the case that the user originates the call) or a GMSC (in the case that the user terminates the call) triggers an intelligent service in accordance with user's CAMEL subscription data, and then the VMSC or the GMSC establishes a control connection with the gsmSCF which provides a prepay service logical control. The gsmSSF reports call related information, monitors the procedure of call establishment and call continuance in accordance with an instruction of the gsmSCF and granted communication duration, and reports corresponding Basic Call Status Model (BCSM) events and Appling Charging Reports during call establishment and the call continuance. The gsmSCF performs a real-time deduction in accordance with the reported information, and judges whether to allow the user to continue with the communication in accordance with a remaining unit, so as to perform the CS domain credit control. Corresponding to the specific implementations introduced as above, before the VMSC or the GMSC routes the call to the CCCF of the user's home IMS, the prepay service implemented based upon the CAMEL is invoked in accordance with the user's subscription data, and the corresponding gsmSCF performs a real-time unit deduction during the call, and in accordance with the remaining unit, judges whether to allow or instruct a control of releasing the call so as to perform the CS domain credit control.

In the IMS, since both the service and the charging criterion are more complicated, an Online Charging System (OCS) as illustrated in FIG. 3 is adopted, which considers comprehensively different aspects with respect to a bearer, a session, an event, etc. The prepay service in the IMS may be also implemented in the architecture, as illustrated in FIG. 3. The OCS of the IMS includes a Bearer Charging Function (BCF), an Event Charging Function (ECF), a Session Charging Function (SCF), a Rating Function (RF), and an Account Business Management Function (ABMF). Based upon the above functions, the following three charging modes may be provided, including:

Immediate Event Charging (IEC): upon receiving a corresponding request, the OCS granting units to an IMS network element is performed in a single operation that also includes the deduction of the corresponding monetary units from a user account;

Event Charging with Unit Reservation (ECUR): the event charging with unit reservation includes the process of requesting, reserving, releasing and returning unused units for events. The deduction of the corresponding monetary units then occurs upon conclusion of the ECUR transaction.

Session Charging with Unit Reservation (SCUR): the session charging with unit reservation is configured for a credit control in a session, including the process of requesting, reserving, releasing and returning unused units for sessions, and the deduction of the corresponding monetary units. During a SIP session there may be repeated execution of unit reservation and debit operations.

The IMS network element may choose to apply the above different modes according to a service or a policy of an operator. In a VCC service, since the charging is for a voice communication, the mode of SCUR is adopted. During processing a session related to a corresponding user, information corresponding to the user is reported to the OCS through a Credit Control Request respectively of Initial, Update and Termination, in particularly, which can be accomplished through an interaction of the AS or S-CSCF in the IMS network with the OCS.

SUMMARY OF THE INVENTION

The present invention provides a method, a device and a system for providing online charging to solve a problem that the existing online charging solutions may not process correctly a relevant fee while provide a service involving simultaneously the CS domain and the IMS, and further avoid the requirement on an online CS/IMS charging correlation, thereby solve a problem of failing to support roaming or failing to implement in practice due to a huge work load caused for the online CS/IMS charging correlation.

The present invention provides the following solutions.

A method for providing an online charging, including:

in a CS domain, not invoking an online charging for a user who subscribes for a service involving simultaneously the CS domain and an IMS and needs the online charging when the user originates or terminates a call in the CS domain; and in the IMS, performing a credit control for the user when the call of the user is processed in the IMS.

In the method, not invoking the online charging for the user in the CS domain is implemented through canceling CAMEL subscription data of the user for performing the online charging in the CS domain, or through modifying service data in an intelligent service platform.

Modifying the service data in the intelligent service platform includes: modifying data or settings related to a service logic determination in a gsmSCF entity and/or an SDP; and when the call of the user is triggered to the gsmSCF, if the gsmSCF determines that the service involving simultaneously the CS domain and the IMS is needed to be performed in accordance with call-related information, not invoking an online charging service logic subscribed by the user in the CS domain.

The credit control is performed through an interaction of an AS controlling the service involving simultaneously the CS domain and the IMS with at least one of an OCS in the IMS and a prepay system in the CS domain.

The method further includes: when the user subscribes for the online charging service simultaneously in the CS domain and the IMS, accomplishing, by the AS controlling the service involving simultaneously the CS domain and the IMS, the credit control in the CS domain and the IMS through interacting with the OCS of the IMS directly via a standard Ro interface and interacting with the prepay system in the CS domain via the OCS of the IMS in accordance with user's subscription data; or, accomplishing, by the AS controlling the service involving simultaneously the CS domain and the IMS, the credit control in the CS domain and the IMS through interacting with the OCS of the IMS via the standard Ro interface and interacting with the prepay system in the CS domain via a CAP interface in accordance with user's subscription data.

The credit control is performed through an interaction of an S-CSCF entity assigned for the user with at least one of the OCS of the IMS and the prepay system in the CS domain.

When the user subscribes for the online charging service simultaneously in the CS domain and the IMS, the credit control is accomplished in the CS domain and the IMS for the user by the S-CSCF entity assigned for the user through an interaction of with the OCS of the IMS and an interaction with the prepay system in the CS domain via the OCS of the IMS; or the credit control is accomplished in the CS domain and the IMS for the user by the S-CSCF entity assigned for the user through an interaction with the OCS of the IMS and an interaction with the prepay system in the CS domain respectively in accordance with user's subscription data.

In the method, triggering by the S-CSCF entity the interaction with the OCS of the IMS to perform the credit control, includes:

forwarding, by the S-CSCF, a service request correlated with the user to an IMS gateway function in accordance with the user's subscription data; and performing, by the IMS gateway function, the credit control through interacting with the OCS of the IMS via the standard Ro interface.

The interaction with the prepay charging system in the CS domain to perform the credit control, includes:

forwarding, by the S-CSCF, a service request correlated with the user to an IM-SSF in accordance with the user's subscription data; and performing, by the IM-SSF, the credit control through interacting with the prepay system in the CS domain via the CAP interface.

If the user subscribes for the online charging service simultaneously in the CS domain and the IMS, the credit control includes: when the user is currently involved in communication in the CS domain, performing, by the prepay system in the CS domain, the credit control in the CS domain for the user; or when the user is currently involved in communication in the IMS, performing, by the OCS of the IMS, the credit control of the IMS for the user; or, performing the credit control for the user in the IMS and the CS domain simultaneously by a certain proportion, respectively through the OCS of the IMS and the prepay system in the CS domain.

When the user subscribes for the online charging service only in one of the CS domain and the IMS, the credit control includes performing only the credit control of the domain where the online charging service is subscribed for.

The credit control includes performing, by a network element in the IMS domain which performs the credit control, a corresponding control on a current communication of the user upon detection that a unit of the user in the CS domain and/or the IMS domain has been exhausted, including: terminating, by the network element in the IMS which performs the credit control, the current communication of the user; when the unit of the user has been exhausted in one of the CS domain and the IMS while has not been exhausted in the other, instructing the user to switch to the network domain with the remaining unit for communication; and when the unit of the user remains in a network domain where the user is currently involved in communication while has been exhausted in the other, prohibiting, the current communication of the user from being transferred to the network domain with an exhausted unit.

The service involving simultaneously the CS domain and the IMS is a VCC service; and the method includes: not invoking the online charging for the user in the CS domain when a CS call originated or terminated by the user is routed to a corresponding CCCF entity for anchoring and performing the credit control for the user in the IMS after anchoring the call of the user to the CCCF entity.

A credit control device includes:

an triggering module configured to trigger an interaction for an online credit control; and a first credit control module configured to interact with an OCS of an IMS to perform a credit control after triggering the interaction for the online credit control.

The credit control device further includes:

a selection module configured to chooses to perform the credit control of the IMS or a CS domain after triggering the interaction for the online credit control; and a second credit control module configured to interact with a prepay system in the CS domain to perform the credit control after triggering the online credit control.

A communication system includes:

a CS domain control device, configured to not invoke an online charging in the CS domain when a user, who subscribes for a service involving simultaneously the CS domain and an IMS and an online charging service, originates or terminates a call in the CS domain;

an IMS control device, configured to trigger the interaction for an online credit control in the IMS to perform a credit control when the call is processed in the IMS; and at least one of an OCS of the IMS and a prepay system of the CS domain, configured to perform the credit control for the user in accordance with a Credit Control Request sent from the IMS control device.

With the centralized credit control being performed in the IMS, the present invention provides a method for implementing an accurate and complete real-time charging/online charging while providing a service involving simultaneously the CS domain and the IMS. Moreover, the present invention further improves the existing static anchoring and IMS centralized control solution for the domain transfer in the VCC service. With the present invention, it is possible to provide the prepay service, which uses the real-time/online charging control mode and has been widely applied, in a complicated control scenario, and thus such a problem may be avoided that an online CS/IMS charging correlation is needed for correcting a relevant fee which makes the solution fail to support roaming or fail to be implemented in practice due to a huge work load. Furthermore, the inventive solutions enhance a capability of controlling the online charging service in view of that the CS/IMS belong to different networks and a tariff difference exists in different network domains, and thus further improve an integrated application of the CS, the WLAN and the IMS network and satisfy the diversified operation demands.

BRIEF DESCRIPTIONS OF THE DRAWINGS

DETAILED DESCRIPTIONS OF THE EMBODIMENTS

Figure 1:
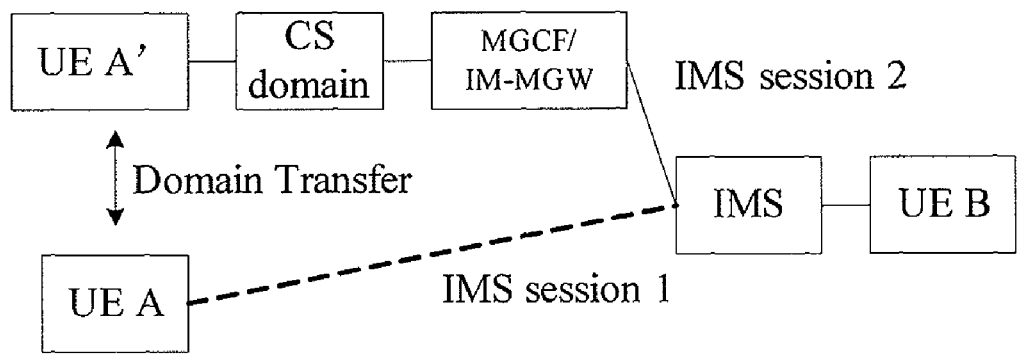
FIG. 1 is a schematic diagram showing that a domain transfer of a VCC user is accomplished by the control of the user's home IMS (CCCF) in the prior art.

To describe the inventive methods and systems more clearly, the inventive solutions will be described in detail with an example that a credit control for an online charging (or referred as a real-time charging) in the CS domain and/or the IMS are implemented during providing a specific service involving simultaneously the CS domain and the IMS, such as, a VCC service. However, the application of the inventive solutions shall not be merely limited to the VCC service, and the inventive principles and methods may be equally applicable to a credit control for an online charging service in the CS domain and/or the IMS in providing another service involving simultaneously the CS domain and the IMS. In an embodiment of the present invention, the online charging may also be described with an example of a prepay service in the CS domain and the IMS.

In view of the problem that simultaneous or separate applications of the methods for providing an online charging service in the CS domain and the IMS may not implement a correct charging when the VCC is provided by applying the static anchoring and the IMS centralized control method for the domain transfer, and the problem that a real-time CS/IMS charging correlation needed for the correct processing of a relevant fee may make the solution fail to support roaming or fail to be implemented in practice due to huge work load. According to the present invention, during the procedure of routing an initial CS domain call originated or terminated by a user, who subscribes for the VCC service and the online charging service, to the CCCF entity for anchoring, an online charging (e.g. prepay) service is not invoked in the CS domain; and after the initial call of the user who subscribes for the VCC service is anchored to the CCCF entity assigned for the user, the interaction for online charging is triggered in the IMS for a centralized credit control for the user who subscribes for the VCC service.

In order not to invoke an online charging/prepay service in the CS domain for a call originated or terminated by the user in the CS domain, the following method may be adopted.

(1) An online charging/prepay service in the CS domain for a call originated or terminated by the user in the CS domain may not be invoked by deleting CAMEL subscription data including originating side CAMEL subscription data and/or terminating side CAMEL subscription data of the user which is used to trigger the interaction for the online charging/prepay service on the CS by the user who subscribes for the VCC service and the CS domain online charging/prepay service (in this way, after the user cancels the VCC service, it is required to restore the CAMEL subscription data for triggering the interaction for the online charging/prepay service).

(2) An online charging/prepay service in the CS domain for a call originated or terminated by the user in the CS domain may not be invoked by modifying service data of an intelligent service platform, in other words, deleting data related to the service logic invoking of the CS online charging/prepay service subscribed by the user on a corresponding gsmSCF and/or a SDP. Hence, even when the corresponding gsmSCF is triggered due to the subscription of the user with another intelligent service, a control of the online charging/prepay service logic will not be invoked and executed.

Alternatively, furthermore, when the invocation of the original online charging/prepay service logic control is avoided through the modification of the service data of the intelligent service platform, it is possible not to invoke an online charging/prepay service in the CS domain by modifying data or settings related to a service logic invoking for the CS prepay service subscribed by the user on a corresponding gsmSCF and/or a SDP. Thus, in accordance with call-related information, the gsmSCF may judge whether to perform a VCC-related call anchoring, and further judge whether to invoke the original control of the online charging/prepay service logic in the current service processing. The call-related information includes, but is not limited to, a bearing capability, and/or, a current location of the user, and/or, a called number, etc.

The way for triggering the interaction for the online charging in the IMS to enable a centralized credit control includes the following.

(1) Triggering the interaction for the online charging in the IMS may be implemented by triggering an OCS of the IMS through the CCCF entity assigned for the user.

In accordance with the user's subscription data, the CCCF entity triggers the online credit control for the OCS of the IMS directly via a standard Ro interface.

(2) Triggering the interaction for the online charging in the IMS may also be implemented by triggering an OCS of the IMS via an IMS gateway function through an S-CSCF entity assigned for the user. In particularly, the S-CSCF forwards a user-related service request to the IMS gateway function in accordance the user's subscription data, and the IMS gateway function triggers the interaction with the OCS of the IMS directly via a standard Ro interface for the OCS.

In a Credit Control Request reported by the CCCF entity or the S-CSCF entity to the OCS of the IMS, the following information may be included in addition to information originally required by the IMS online charging service: an indication of the VCC service, and/or, the current call direction (i.e., the call being processed is originated by the served user or is originated by another user and delivered to the served user), and/or, a network domain where the user is currently involved in communication.

The CCCF entity or the S-CSCF entity may determine the information on a network domain where the user is currently involved in communication in accordance with contents of a header field P-Access-Network-Info in a session establishment message or a subsequent routing direction determined by a Network Domain Selection (NeDS) function.

The CCCF entity or the S-CSCF entity may determine the information on the current call direction in accordance with information on calling and called users in a session establishment message.

Furthermore, upon occurrence of a domain transfer during the communication of the user who subscribes for the VCC service, the OCS of the IMS is instructed to perform the credit control update, for instance, implementing a changed tariff for charging correctly, which may be described as following.

When the user requests a domain transfer in the VCC service, a network element triggering the interaction for the online charging in the IMS, reports a request for performing a credit control update to the OCS of the IMS. In addition to information originally required by the IMS online charging service, the request includes: a network domain where the user was involved in communication prior to the domain transfer, and/or, a network domain where the user will be involved in communication after the domain transfer. Particularly, the network element in the IMS, which triggers the interaction for the online charging, may be the CCCF entity assigned for the user or the S-CSCF entity assigned for the user; and the network element in the IMS, which triggers the interaction for the online charging, may determine the network domain where the user was involved in communication prior to the domain transfer in accordance with a local record, and determine the network domain where the user will be involved in communication after the domain transfer in accordance with contents of a P-Access-Network-Info header field in an INVITE message requesting for the domain transfer.

As described above, for correct charging, the network element in the IMS, which triggers the interaction for the online charging, adds the information related to the VCC service to the reported message, and the OCS of the IMS may integrate the information originally required by the IMS online charging service and the added relevant information to calculate a fee. The information related to the VCC service includes, but is not limited to, an indication of the VCC service, and/or, the current call direction, and/or, a network domain where the user was involved in communication prior to the domain transfer, and/or, a network domain where the user will be involved in communication after the domain transfer.

When the user subscribes for the online charging service simultaneously in the CS domain and the IMS, different user accounting systems may exist in the CS domain and the IMS to store different prepay data of the user in the CS domain and the IMS. For instance, when the CS domain and the IMS belong to different operators, for performing a centralized credit control in the IMS, the network element in the IMS, which triggers the interaction for the online charging, may perform an indirect and real-time interaction with a prepay system in the CS domain through the OCS of the IMS so as to accomplish simultaneously the credit control in the CS domain and the IMS. Alternatively, the network element in the IMS, which triggers the interaction for the online charging, may interact respectively with the OCS of the IMS and the prepay system in the CS domain so as to accomplish simultaneously the credit control in the CS domain and the IMS. Regardless of which method is used to accomplish the online credit control in the CS domain and/or the IMS, the ways for implementing the credit control may include the following.

(1) A corresponding network domain may be determined to perform the credit control dependent upon which network domain the user is currently involved in communication. In other words, if the user is currently involved in commutation in the CS domain, the credit control in the CS domain, including real-time unit deduction and monitoring, is performed through the interaction with the prepay system in the CS domain, and if the user is currently involved in communication in the IMS, the credit control of the IMS, including real-time unit deduction and monitoring, is performed through the interaction with the OCS of the IMS.

(2) Independent of which network domain the user is currently involved in communication, the credit control in the CS domain and the IMS, including real-time unit deduction and monitoring, is performed simultaneously by a proportion through the interaction with OCS of the IMS and the prepay system in the CS domain respectively.

When the user subscribes for the online charging service in only one of the CS domain and the IMS, the interaction for online charging in the IMS is still triggered to perform the online credit control. At this time, through the OCS of the IMS and/or the prepay system in the CS domain, in accordance with the subscription of the user or an indication of the network element which triggers the interaction for online charging in the IMS, the credit control, including real-time unit deduction and monitoring, is not performed for the domain where no online charging service has been subscribed.

When the prepay system in the CS domain and/or the OCS of the IMS and/or the network element which triggers the interaction for the online charging in the IMS detect that the user has exhausted the prepaid unit in the CS domain and/or the IMS, the network element which triggers the interaction for online charging in the IMS may determine to perform a different control on the current communication of the user in accordance with an operation strategy, including:

(1) In the case that different user accounting systems exist in the CS domain and the IMS, a corresponding network domain is selected to perform the credit control dependent upon which network domain the user is currently involved in communication:

A) If the unit in the CS domain has been exhausted and the user is currently involved in communication in the CS domain, or the unit of the IMS has been exhausted and the user is currently involved in communication in the IMS, the network element which triggers the interaction for the online charging in the IMS terminates the current communication of the user or instructs the user to perform the domain transfer to the other domain with a remaining unit for the continuation of the current communication.

The network element which triggers the interaction for the online charging in the IMS may instruct the user to perform the domain transfer to the other domain with a remaining unit for the continuation of the current communication, respectively through an USSD message in the CS domain or the SIP Notify or INFO message of the IMS dependent upon the network domain where the user is currently involved in communication.

B) If the unit in the CS domain has been exhausted and the user is currently involved in communication in the IMS, or the unit of the IMS has been exhausted and the user is currently involved in communication in the CS domain, the network element which triggers the interaction for online charging in the IMS prohibits the current communication of the user from being transferred subsequently to the network domain with the unit being exhausted.

The network element which triggers the interaction for the online charging in the IMS may reject a new session establishment request of the user for requesting the domain transfer with a specific reason value through the CCCF entity, or inform the user of the reason for prohibiting the domain transfer, respectively through a USSD message in the CS domain or the SIP Notify or INFO message of the IMS.

(2) If the same accounting system is used in the CS domain and the IMS, or it does not need to distinguish that which domain the user is currently involved in communication, and the credit controls in the CS domain and the IMS are simultaneously performed by a proportion, then regardless of which domain the user is currently involved in communication, the network element which triggers the interaction for the online charging in the IMS terminates the current communication of the user once the unit of the user in the CS and/or IMS has been exhausted.

Since no online charging/prepay service is invoked in the CS domain, a postpaid Call Detailed Record (CDR) will be generated in the CS domain after a CS call is established according to the prior art. In order to avoid a charging mistake, during the routing control for routing the CS domain call originated or terminated by the user to the corresponding CCCF entity for anchoring, it is possible to control carrying a specific identifier in the CDR generated in the CS domain. This identifier may be a specific number of the CCCF entity; Alternatively, the identifier may also be a specific prefix before the calling number which is inserted by a GSM Service Switching Function (gsmSSF) under the instruction of the gsmSCF through an existing CAP CONNECT operation, or the free-format charging information issued to the gsmSSF by the gsmSCF through an existing CAP FCI (Furnish Charging Information) operation; and a charging processing apparatus in the CS domain performs the free-charge processing on the CDR generated in the CS in accordance with the specific identifier.

Detailed descriptions will be given with reference to specific embodiments and in conjunction with the drawings.

Embodiment 1

Figure 4:
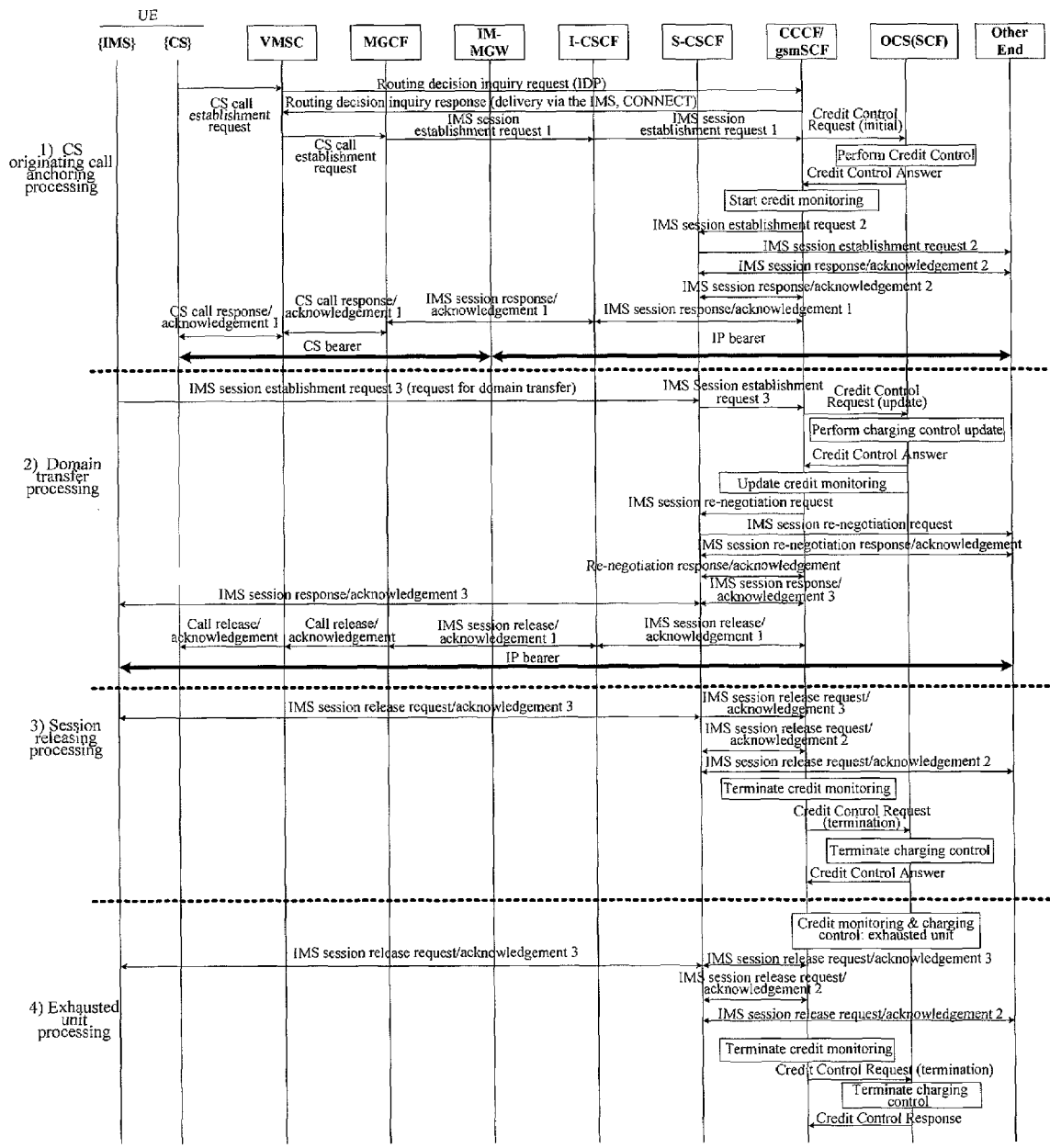
FIG. 4 is a flow chart of performing a CS/IMS online credit control in the IMS during an entire voice communication where a CS originating call is anchored to the IMS, the interaction for online charging is triggered in the IMS, and the user is transferred to the IMS in an embodiment of the present invention.

For example, the user originates a call in the CS domain and subsequently requests performing the domain transfer to the IMS after the call is anchored to the CCCF, and the CCCF triggers the interaction for the online charge in the IMS, a specific implementation thereof is as illustrated in FIG. 4 (wherein, steps 1 to 5 refer to the part of "CS originating call anchoring" in FIG. 4, steps 6 to 8 refer to the part of "domain transfer" in FIG. 4, step 9 refers to the part of "Session release", and step 10 refers to the part of "Exhausted unit" in FIG. 4).

Figure 2A:
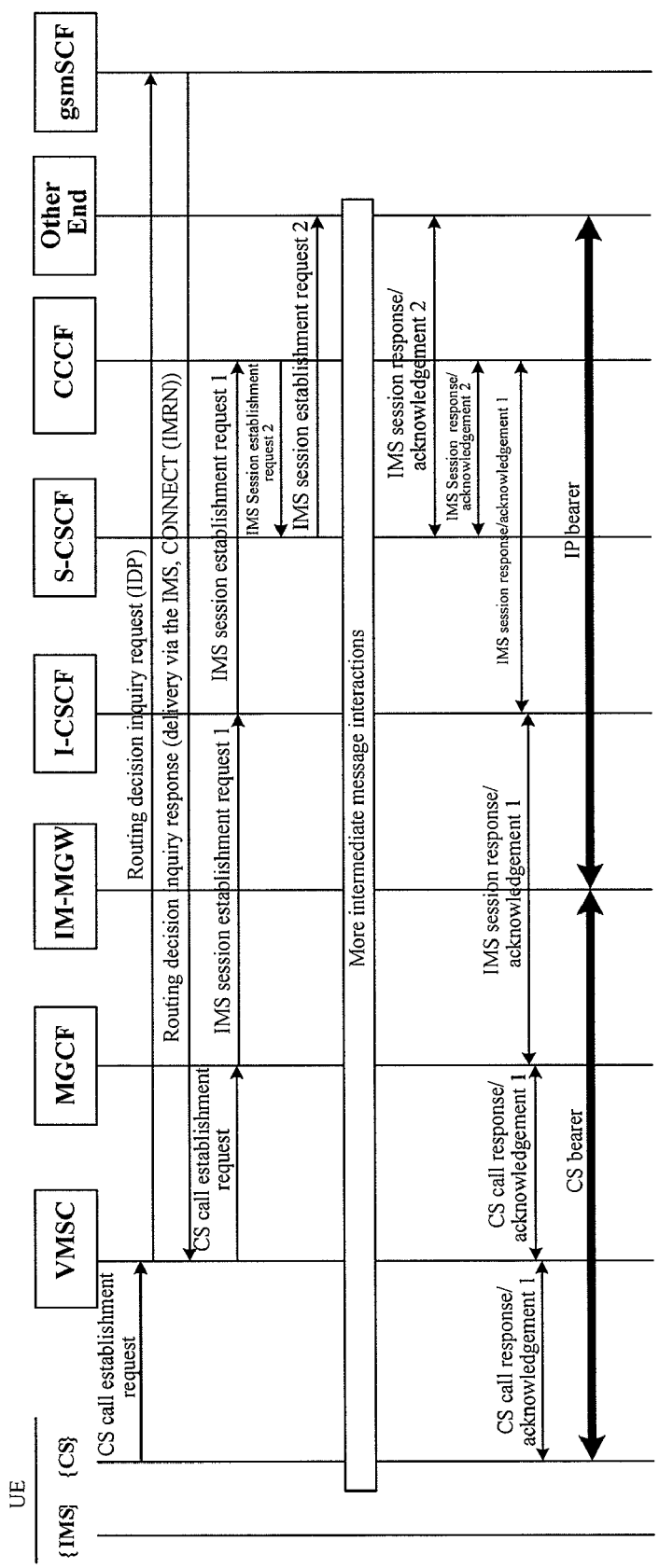
FIG. 2A is a flow chart for establishing a signaling and a bearer connection in an CS originating call before performing a VCC domain transfer from the CS domain to the IMS in the prior art.
Figure 2B:
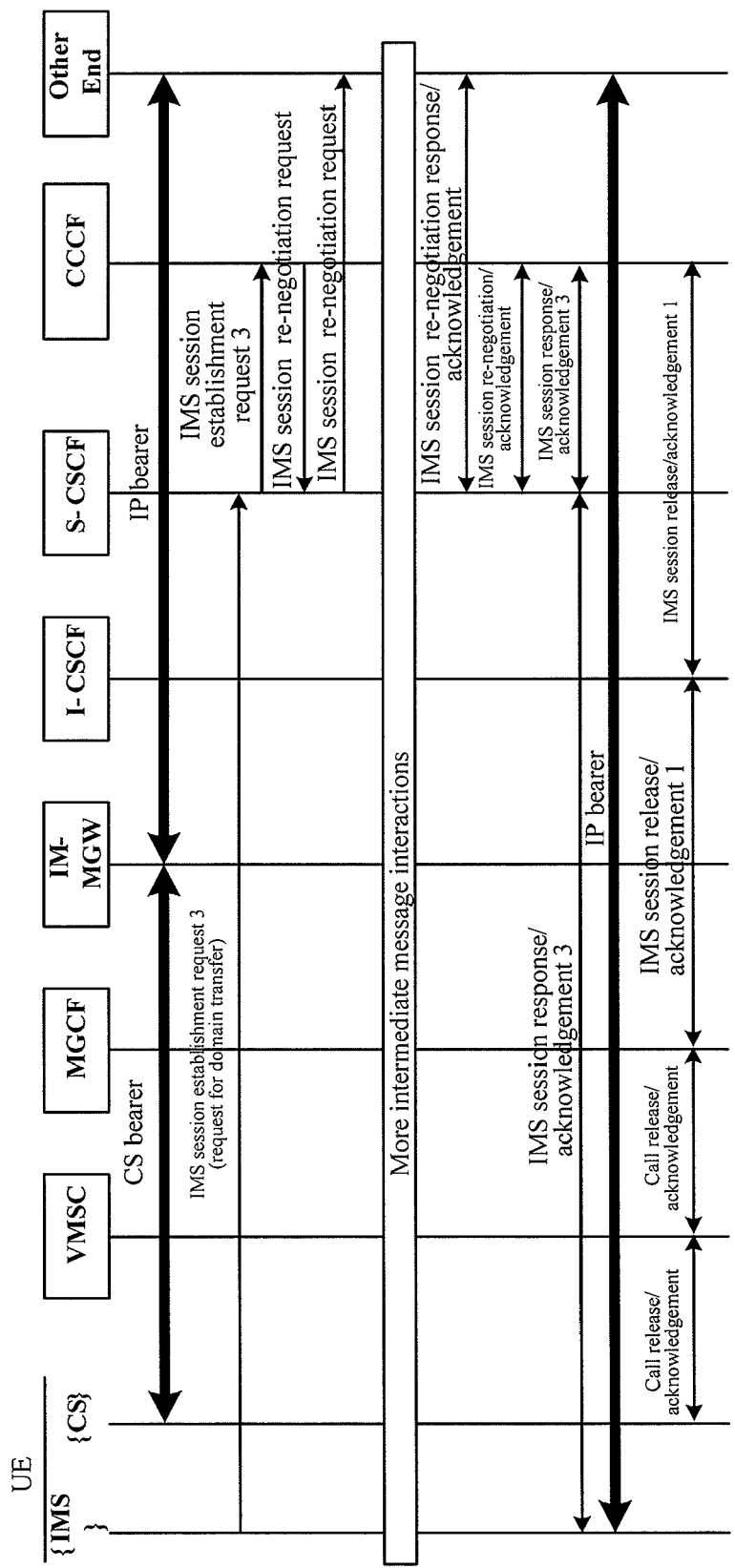
FIG. 2B is a flow chart showing that a user initiates a VCC domain transfer from the CS domain to the IMS in the prior art.
Figure 2C:
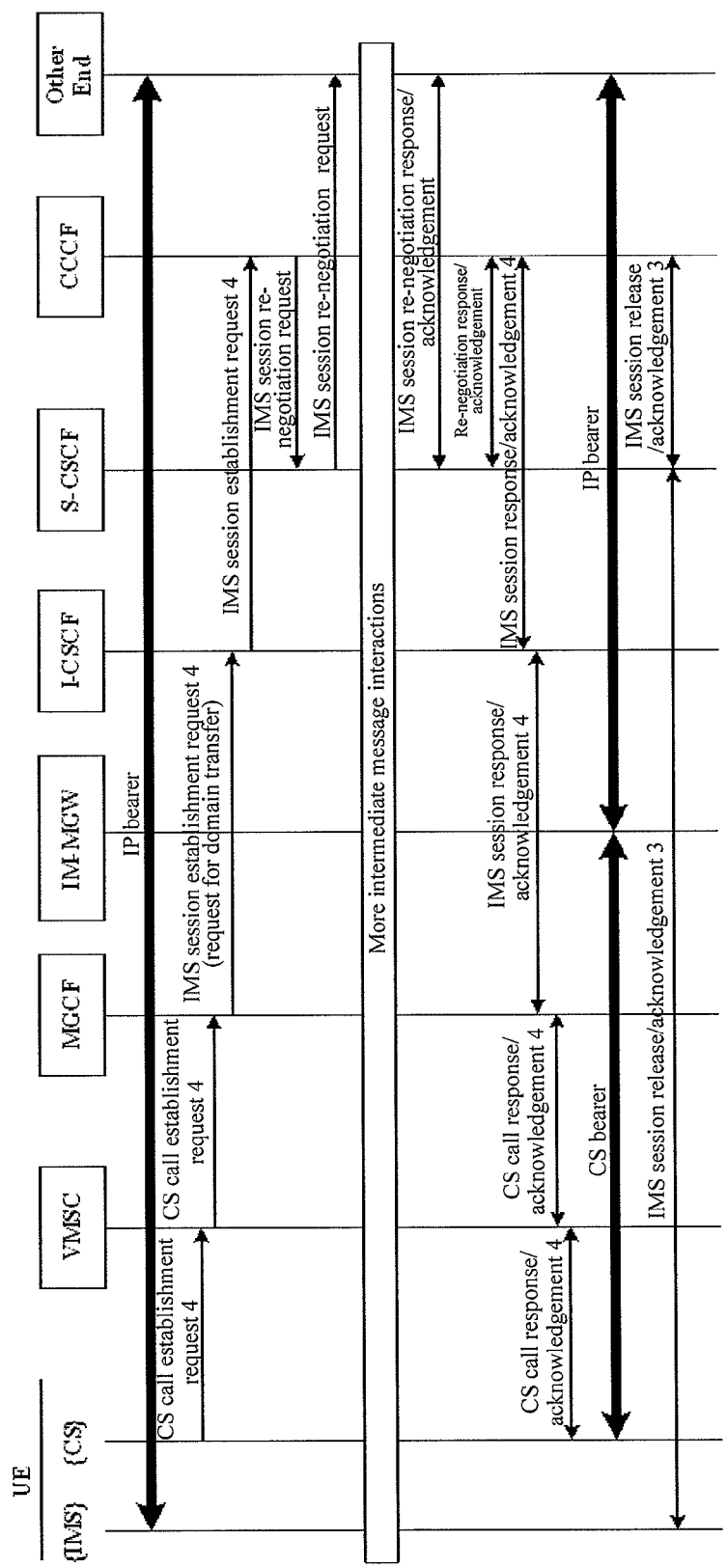
FIG. 2C is a flow chart for establishing a signaling and a bearer connection in a subsequent domain transfer from the IMS back to the CS domain in the prior art.
Figure 3:
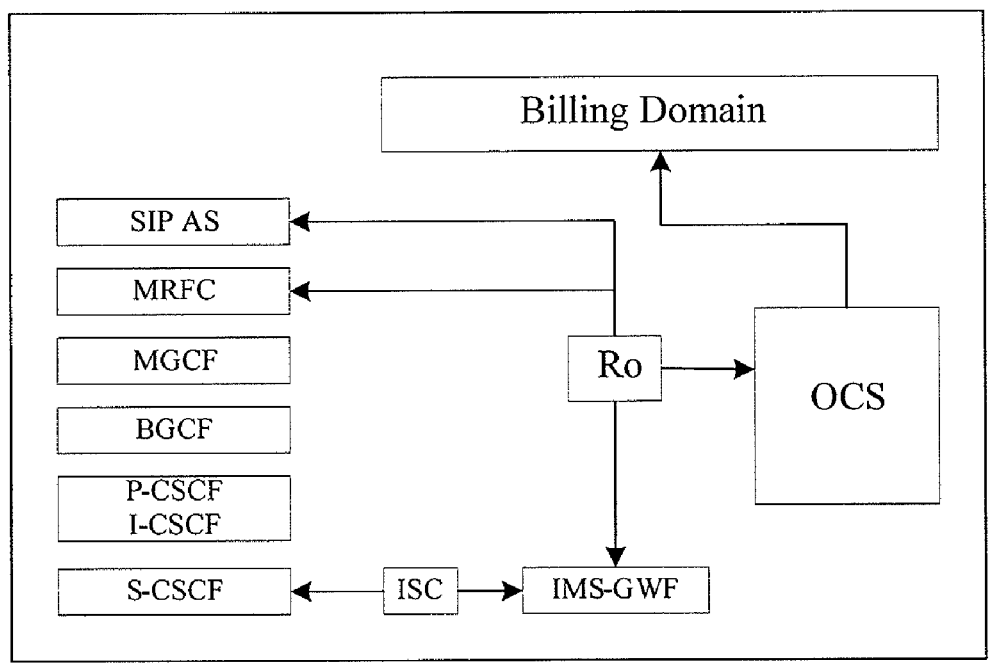
FIG. 3 is a schematic diagram of an OCS of the IMS in the prior art.

As described above, it shall be noted that the prior art provides different solutions with different details for implementing the anchoring of the CS originating call and the domain transfer between the CS domain and the IMS, but these solutions are irrelevant to the implementation of inventive solution. Therefore, in present embodiment, only the flow for anchoring the CS originating call to the CCCF and the domain transfer from the CS to the IMS illustrated in FIG. 2 are taken as an example, and other implantation procedures in the prior art which are irrelevant to the implementation of inventive solutions will not be repeated. However, the inventive solutions are also applicable to other implementation procedures.

1. The VCC user originates a call at a VMSC in the CS domain where the user registers.

2. The VMSC triggers an originating side intelligent service in accordance with user's subscription data, and sends an Initial Detection Point (IDP) message to the gsmSCF responsible for originating side's routing controlling. At this time, since the anchoring of the user's originating call to the CCCF is accomplished through the gsmSCF responsible for originating side's routing controlling, it is possible to modify data or setting in the intelligent service platform related to a service logic determination so as to avoid the invoking of the online charging/prepay service in the CS domain, so that even when the corresponding gsmSCF is triggered due to subscription of the user for the VCC service, the control of the online charging/prepay service logic will not be invoked. Furthermore, the gsmSCF may determines a need of providing the VCC service in accordance with call-related information, and thus determine that the control of the online charging/prepay service logic subscribed by the user in the CS domain will not be invoked.

If the anchoring of the originating call to the CCCF in the VCC service is accomplished using a solution other than the CAMEL solution and the user does not subscribe for any other intelligent service, it is possible to cancel corresponding CAMEL subscription data of the user in the CS domain prior to the call, in other words, avoid directly triggering of the CAMEL service so as to avoid invoking the online charging/prepay service provided as a CAMEL service by the CS domain.

3. The gsmSCF responsible for originating side's routing controlling returns a virtual roaming number, i.e., an IP Multimedia Routing Number (IMRN), pointing to the CCCF of the user home IMS through the CONNECT message, and in accordance with this, the VMSC routes the CS-IMS interworking session to the CCCF entity assigned for the user through other network elements in the CS domain, the CS/IMS interworking gateway MGCF and the IMS-related network element (an Interrogating-Call Session Control Function (I-CSCF) is illustrated in the figure).

4. The CCCF entity triggers the interaction for the online charging control in the IMS in accordance with the user's subscription data, for instance, a subscription for the online charging service, and sends an initial CCR to the OCS of the IMS. In addition to information originally required for the IMS online charging service, the initial CCR may also include: an indication of the VCC service, and/or, the current call direction (i.e., the call being processed is originated by the served user or by another user and delivered to the served user), and/or, a network domain where the user is currently involved in communication.

5. The OCS of the IMS performs the charging control in accordance with the reported information, and returns a Credit Control Answer (CCA) which carries a unit granted for use or service information, and in accordance with this, the CCCF entity initiates the credit control. Thereafter, the CCCF entity, as a final called element, terminates the received session, interacts with the HSS to obtain a functions-CSCF assigned for the user, and then in accordance with information carried in the received session establishment request, reinitiates another segment of session to the original opposite user on behalf of the VCC user through the S-CSCF, and correlatively controls the establishment of the two segments of the session in a 3PCC way. Finally, the CS-IMS interworking session from the VCC user to the CCCF entity of the VCC user's home IMS domain via the CS domain and the CS-IMS interworking gateway MGCF, and the session from the CCCF entity to the opposite user are established, and the CCCF entity correlatively controls the two segments of the session to establish the bearer connection including a segment of CS bearer and a segment of IP bearer, segmented by a IM-MGW (till now, the first phase of anchoring the CS originating call has been completed).

6. When the user completes an IMS registration and makes a decision of performing a domain transfer to the IMS, the user initiates an IMS originating session establishment request to the CCCF carrying information of the initial session, and with a Public Service Identity (PSI) of the CCCF carried therein as a domain transfer indication, requesting the CCCF entity to perform the domain transfer from the CS domain to the IMS for the currently established CS domain call. The Serving-CSCF assigned for the user by the network routes the session establishment request to the CCCF entity in accordance with an initial Filtering Criterion (iFC) in the user's subscription data.

7. The CCCF entity performing a credit monitoring sends an update CCR to the OCS of the IMS for performing the credit control update. In addition to information originally required by the online charging service of the IMS, the update CCR may further include: a network domain where the user was involved in communication prior to the domain transfer, and/or, a network domain where the user will be involved in communication after the domain transfer.

8. The OCS of the IMS performs the credit control update in accordance with the reported information, and returns a CCA carrying a unit granted for use or the service information, and in accordance with this, the CCCF entity performs the updated credit control. Thereafter, the CCCF entity executes an SIP session transfer procedure for replacing a CS access leg of the VCC user with an IMS access leg, and accomplishes a redirection of a media stream interaction through UPDATE or re-INVITE over the segment of session with the opposite end. Upon successfully performing the transfer of the SIP session, the signaling and the bearer connection corresponding to the CS access leg of the VCC user are released (till now, the second phase of the domain transfer has been completed, and subsequent domain transfer procedures are similar to this, and will not be repeated).

9. When the user makes a decision of ending the current communication (for example, the served user who subscribes for the VCC service initiates a call release), the user sends a request for releasing the session to the CCCF entity, and the S-CSCF entity assigned for the user by the network routes the request for releasing the session to the CCCF entity. The CCCF entity performing a credit monitoring interacts with the users on both sides to complete the release of the two segments of the session, terminates the credit monitoring, and sends a termination CCR to the OCS of the IMS. In accordance with the reported information, the OCS of the IMS terminates the charging control, and returns a CCA to terminate the online charging procedure. Herein, for the convenience of the abnormality processing for the interaction with the OCS of the IMS, the CCCF may also terminate the local credit monitoring after receiving the CCA from the OCS of the IMS (till now, the third phase of releasing the session has been completed).

10. If the CCCF entity performing the credit monitoring detects the exhausted unit of the user before the user releases the session on his own initiative (if only the unit currently granted for use has been exhausted, the CCCF entity will just apply for a new grant by sending a update CCR, and here for example, the unit of the user has been totally exhausted), then the CCCF entity initiates on its own initiative a release message and interacts with the users of both side to complete the release of two segments of the session, and then terminates the credit monitoring and sends a termination CCR to the OCS of the IMS. In accordance with the reported information, the OCS of the IMS terminates the charging control, and returns a CCA to terminate the online charging procedure. Alike, for the convenience of abnormality processing for the interaction with the OCS of the IMS, the CCCF may also terminate the local credit monitoring after receiving the CCA from the OCS of the IMS (till now, the processing for the exhausted unit has been completed).

The descriptions have been given in the first embodiment by taking the case that the VCC user originates a call in the CS domain as an example. If the user terminates a call in the CS domain, the method for avoiding the invoking of the prepay service in the CS domain and the procedure for a centralized credit control in the IMS are substantially identical except for an anchoring procedure.

If the initial call is a call originated or terminated by the user in the IMS, the procedure for the control in the CS domain on routing to the home IMS is absent as compared with the above flow. Therefore, there will be no problem of avoiding the invoking of the online charging/prepay service in the CS domain in establishing the initial call (however, the same problem may still arise if a call establishment request is initiated by the user, while the call establishment request points to the CCCF entity and requests performing a domain transfer from the IMS to the CS domain, and the problem can also be solved with the above way). In addition to this, the centralized credit control in the IMS is identical to that in the first embodiment.

In the first embodiment, the CCCF entity performs the triggering the interaction for the centralized credit control, and in accordance with the existing IMS online charging technologies, the S-CSCF entity assigned for the user can also perform the triggering for the centralized credit control of the online charging through an IMS gateway function, although the CCCF entity, as a control point of the VCC service, can learn more relevant information.

Furthermore, for focusing on the credit control procedure in the VCC service, the descriptions in the present embodiment have been given on the credit control interaction between the network element in the IMS, which triggers the interaction for online charging, and the OCS of the IMS. When different user accounting systems exist in the CS domain and the IMS to respectively store prepay data of the user in the CS domain and the IMS, interactions with the prepay system in the CS domain and/or the OCS of the IMS will be accomplished for the online credit control in accordance with the second embodiment.

Embodiment 2

When different user accounting systems exist in the CS domain and the IMS to respectively store prepay data of the user in the CS domain and the IMS, the network element in the IMS, which triggers the interaction for online charging, can interact with the OCS of the IMS, and interact indirectly in a real-time way with the prepay system in the CS domain through the OCS of the IMS. Alternatively, the network element in the IMS, which triggers the interaction for online charging, may interact directly with the OCS of the IMS and the prepay system in the CS domain respectively to perform a unit deduction in the CS domain and the IMS, a specific implementation of which is as follows.

Figure 5A:
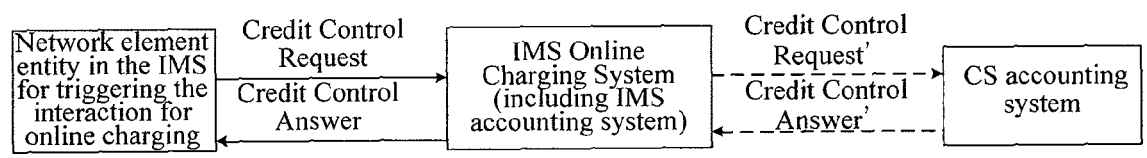
FIG. 5A is a schematic diagram of a real-time interaction between an entity which triggers the interaction for online charging in the IMS and a prepay system in the CS domain through an OCS of the IMS in an embodiment of the present invention.

The first way is an indirect real-time interaction with the prepay system in the CS domain through the OCS of the IMS, as illustrated in FIG. 5A.

After receiving the CCR sent from the network element in the IMS which triggers the interaction for the online charging, the OCS of the IMS requests directly the CS domain prepay system including a CS accounting system to perform a credit control as needed, and returns a CCA to the network element in the IMS triggering the interaction for online charging, in accordance with a result returned form the CS domain prepay system including the CS domain accounting system. The OCS of the IMS and the CS domain prepay system including the CS domain accounting system interact through the CAMEL Application Protocol (CAP) or other self-defined protocols.

Figure 5B:
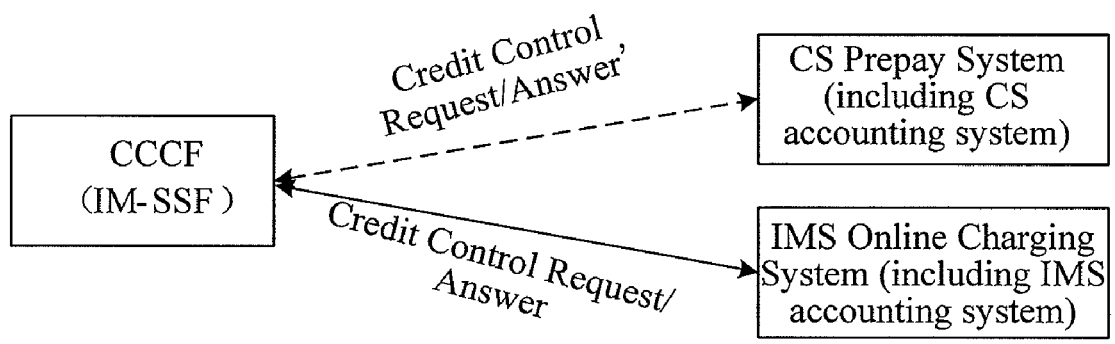
FIG. 5B is a schematic diagram of interactions of a CCCF assigned to the user, which is configured to trigger the interaction for online charging for the user, respectively with an OCS of the IMS and a prepay system in the CS domain in an embodiment of the present invention.

The second way is through direct interactions of the CCCF entity assigned for the user respectively with the OCS of the IMS and the prepay system in the CS domain, as illustrated in FIG. 5B.

In addition to the interaction with the OCS of the IMS through the standard Ro interface, the network element in the IMS triggering the interaction for online charging, i.e., the CCCF entity, also serves as an IM-SSF, which triggers the interaction for prepay service with the CS prepay system including the CS accounting system through the CAP interface, and requests a credit control in accordance with the way for an original CAP interface interaction of the CS prepay service, and performs the CS domain credit control including a real time unit deduction and monitoring. At this time, the CCCF entity also chooses to perform the credit control, including a unit deduction and monitoring, in the CS domain and/or the IMS in accordance with the network domain where the user is currently involved in communication and/or a preset strategy (for instance, the fee for communication is apportioned by a certain proportion of the CS/IMS) as described above. Moreover, since the CAP interface is incapable of reporting a rate change event during a call, it is required that the control relationship between the CCCF entity and the prepay system in the CS domain be maintained during the whole duration of the communication and the communication may be charged as one communication with a fixed rate; or the CCCF triggers the service control of the CS prepay system for several times in accordance with the need of performing a unit deduction and monitoring in the CS domain.

Figure 5C:
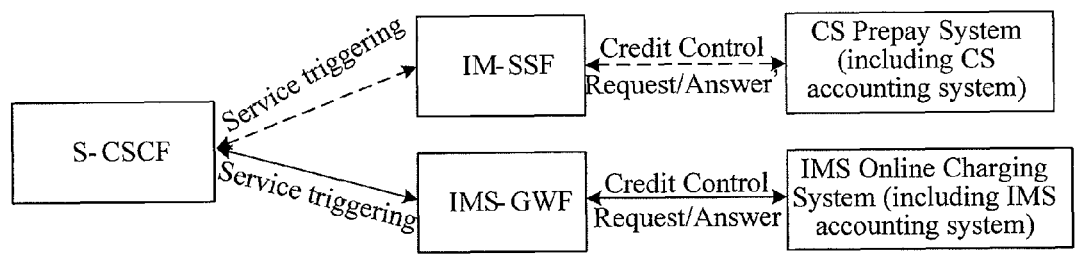
FIG. 5C is a schematic diagram of interactions of a S-CSCF assigned to the user, which is configured to trigger the interaction for online charging for the user, respectively with an OCS of the IMS and a prepay system in the CS domain in an embodiment of the present invention.

The third way is through interactions of the S-CSCF entity assigned for the user respectively with the OCS of the IMS and the prepay system in the CS domain, as illustrated in FIG. 5C.

The network element in the IMS triggering the interaction for online charging, i.e., the S-CSCF entity, respectively triggers the IM-SSF and the IMS gateway function simultaneously in accordance with user's subscription data. The IM-SSF triggers the interaction for prepay service with the CS domain prepay system including the CS accounting system through the CAP interface, requests a credit control in accordance with the way of an original CAP interface interaction of the CS prepay service, and performs the CS domain credit control including a unit deduction and monitoring. The IMS gateway function interacts with the OCS of the IMS through the standard Ro interface to perform the credit control of the IMS. At this time, the S-CSCF entity also chooses to perform the credit control, including a unit deduction and monitoring, in the CS domain and/or the IMS in accordance with the network domain where the user is currently involved in communication and/or a preset strategy (for instance, the fee for communication is apportioned by a certain proportion of the CS/IMS) as described above. Moreover, since the CAP interface is incapable of reporting a rate change event during a call, it is required that the control relationship between the IM-SSF entity and the prepay system in the CS domain should be maintained during the whole communication and that the communication should be charged as one communication with a fixed rate, or the IM-SSF entity triggers the service control of the CS prepay system for several times in accordance with a need of performing a unit deduction and monitoring in the CS domain.

Although the above embodiments are described with a VCC service as an example among those services involving simultaneously the CS domain and the IMS, it should be appreciated by those skilled in the art that the method for a centralized credit control in the CS domain and/or the IMS, which is implemented by avoiding invoking the online charging/prepay service in the CS domain and by triggering the interaction for online charging in the IMS, may also solve the problems in other services involving simultaneously the CS domain and the IMS although there may be a mere difference in specific processing of events or information related to the services. Other services involving simultaneously the CS domain and the IMS include the Combined CS bearer and IMS (CSI) service of combining a CS bearer and an IMS service, and the IMS Centralized control Service (ICS) for providing a centralized service control through the IMS to a user accessing to the network through the CS domain and/or the IMS, and the problems include that separate or simultaneous applications of the existing online charging/prepay service in the CS domain and the IMS may lead to failure in charging accurately and completely or failure in avoiding the repetitive charging in the CS domain and the IMS. The difference in specific processing includes the processing of the event and information related to the VCC domain transfer as involved in the above embodiments and the processing for the AS which processes the service involving simultaneously the CS domain and the IMS.

Accordingly, a communication system of the present invention includes the following.

A CS domain control device, configured to avoid invoking the online charging/prepay service in the CS domain when a user, who subscribes for a service involving simultaneously the CS domain and the IMS and the prepay service, originates or terminates a call in the CS domain. For instance, the CS domain control device includes: the user's home HLR, configured to cancel the CAMEL subscription data used by the user for enabling the online charging/prepay service in the CS domain in the user subscription data provided to the VMSC and the GMSC of the user during anchoring the CS call originated or terminated by the user to the user's home IMS in the VCC service and thus not to invoke the online charging/prepay service for the user in the CS domain; the gsmSCF entity, configured not to invoke the online charging/prepay service logic subscribed by the user in the CS domain upon determination of a need for providing the service involving simultaneously the CS domain and the IMS after receiving the triggering message of the call correlated with the user; and the like.

An IMS control device, configured to trigger the interaction for the online charging in the IMS for the centralized credit control when the call correlated with the user is processed in the IMS. For instance, the IMS control device includes the S-CSCF entity or the AS in the IMS, especially the S-CSCF entity or the CCCF entity in VCC service, configured to trigger the interaction for online charging after anchoring the call correlated with the user to the AS that controls the VCC service, i.e. the CCCF.

As illustrated in FIG. 5A, the IMS control device may interact with the OCS of the IMS, and interacts indirectly with the prepay system in the CS domain through the real-time interactions between the OCS of the IMS and the prepay system in the CS domain, so as to implement the centralized credit control. Alternatively, as illustrated in FIGS. 5B and 5C, the IMS control device may also directly interact with the OCS of the IMS and the prepay system in the CS domain respectively, so as to implement the centralized credit control.

The OCS of the IMS and/or the prepay system in the CS domain is configured to perform the credit control for the user in accordance with the CCR sent from the IMS control device.

In the VCC service, if the user subscribes for the online charging/prepay service in the CS domain, the CS domain also includes a CS domain charging system, configured to perform a charge-free processing on a CDR generated in the CS domain for the user in accordance with a specific identification, such as the number of the CCCF entity or a specific prefix inserted before the calling number or the free-format charging information issued from the gsmSCF to the gsmSSF.

Figure 6:
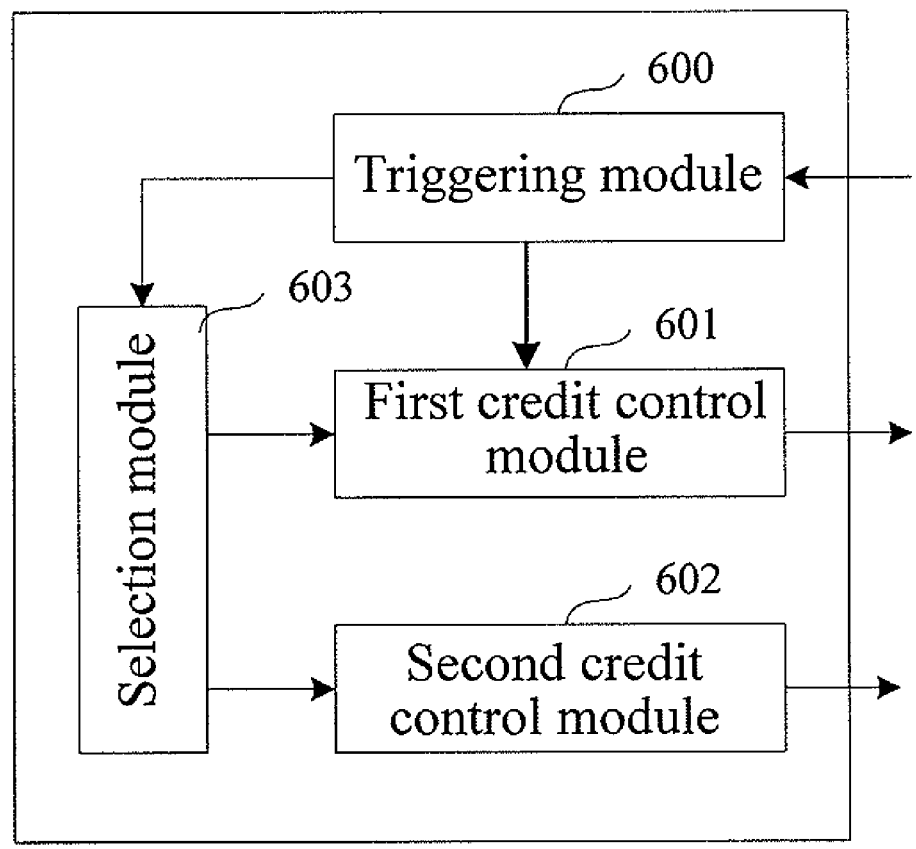
FIG. 6 is a schematic diagram of the structure of a CCCF entity according to an embodiment of the invention.

Accordingly, FIG. 6 illustrates a structure of an AS with a credit control function, including a triggering module 600, a first credit control module 601, a second credit control module 602 and a selection module 603. The triggering module 600 triggers the interaction for the online charging after receiving a session establishment request, the first credit module 601 interacts with the OCS of the IMS after the triggering of the interaction for the online charging to perform the credit control, the second credit control module 602 interacts with the prepay system in the CS domain after the triggering of the interaction for the online charging to perform the credit control, and the selection module 603 chooses to perform the credit control of the IMS or the CS domain.

With reference to the different methods for interacting with the prepay system in the CS domain as illustrated in FIG. 5A and FIG. 5B, it can be seen that the second credit control module and the selection module are optional. In other words, when only the triggering module and the first credit control module are included, the triggering module in the AS triggers the interaction for the online charging in accordance with the user's subscription data, uses the first credit control module to interact with the OCS of the IMS directly through the standard Ro interface, and interacts with the prepay system in the CS domain through the OCS of the IMS as illustrated in FIG. 5A, thus accomplishing the credit control in the CS domain and the IMS for the user. When the second credit control module and the selection module are further included as illustrated in FIG. 5B, the triggering module in the AS triggers the interaction for online charging in accordance with the user's subscription data, uses the first credit control module to interact with the OCS of the IMS through the standard Ro interface, and uses the second credit control module to interact with the prepay system in the CS domain through the CAP interface, respectively, and chooses in accordance with the network domain where the user is currently involved in communication or the preset charging strategy through the selection module, thus accomplishing the credit control in the CS domain and the IMS for the user.

Obviously from the above, with triggering the interaction for the online charging service in the IMS to perform the centralized credit control, the present invention provides a method for an accurate and complete real-time charging/online charging control while providing a service involving simultaneously the CS domain and the IMS, so as to provide a method for the online charging/prepay service using the real-time/online charging control mode. Moreover, the present invention further improves the existing static anchoring and the IMS centralized control solution for the domain transfer in the VCC service. With the inventive solutions, it is possible to provide the online charging/prepay service widely used, and thus such problems can be avoided that a real-time CS/IMS charging correlation is required for a correct processing of a relevant fee and thus the roaming is failed to be supported or failed to be implemented in practice due to the huge work load. Furthermore, the inventive solutions enhance a capability of controlling the online charging service in view of that the CS domain and IMS belong to different operators and a tariff difference exists in different network domains. With the present invention, an integrated application in the CS domain, the WLAN and the IMS network may be further facilitated.

It shall be evident that those skilled in the art can make various modifications and variations to the present invention without departing from the spirit and scope of the present invention. As such, the present invention is intended to encompass the modifications and variations provided they fall within the scope of the claims of the present invention and equivalents thereof.

The invention claimed is:

1. A method for providing an online charging, comprising:
   in a Circuit Switched (CS) domain, not invoking an online charging for a user who subscribes for a service involving simultaneously the CS domain and an IP Multimedia Subsystem (IMS) and needs the online charging, when the user originates or terminates a call in the CS domain; and
   in the IMS, performing a credit control for the user when the call of the user is processed in the IMS;
   wherein the credit control is performed through an interaction of an Application Server (AS) controlling the service involving simultaneously the CS domain and the IMS with at least one of an online charging system (OCS) in the IMS and a prepay system in the CS domain; when the user subscribes for the online charging service simultaneously in the CS domain and the IMS, accomplishing, by the AS controlling the service involving simultaneously the CS domain and the IMS, the credit control in the CS domain and the IMS through interacting with the OCS of the IMS directly via a standard Ro interface and interacting with the prepay system in the CS domain via the OCS of the IMS in accordance with user's subscription data; or, accomplishing, by the AS controlling the service involving simultaneously the CS domain and the IMS, the credit control in the CS domain and the IMS through interacting with the OCS of the IMS via the standard Ro interface and interacting with the prepay system in the CS domain via a CAP interface in accordance with user's subscription data.

2. The method according to claim 1, wherein not invoking the online charging for the user in the CS domain is implemented through canceling Customized Application of Mobile Network Enhanced Logic (CAMEL) subscription data of the user for performing the online charging in the CS domain, or through modifying service data in an intelligent service platform.

3. The method according to claim 2, wherein, the modifying the service data in the intelligent service platform comprises: modifying data or settings related to a service logic determination in a GSM Service Control Function (gsmSCF) entity or a Service Data Point (SDP); and when the call of the user is triggered to the gsmSCF, if the gsmSCF determines that the service involving simultaneously the CS domain and the IMS needs to be performed in accordance with call-related information, not invoking an online charging service logic subscribed by the user in the CS domain.

4. The method according to claim 1, further comprising when the user is currently involved in communication in the CS domain, performing, by the prepay system in the CS domain, the credit control in the CS domain for the user; or when the user is currently involved in communication in the IMS, performing, by the OCS of the IMS, the credit control of the IMS for the user; or, performing the credit control for the user in the IMS and the CS domain simultaneously by a proportion, respectively through the OCS of the IMS and the prepay system in the CS domain.

5. The method according to claim 1, wherein when the user subscribes for the online charging service only in one of the CS domain and the IMS, the credit control comprises performing only the credit control of the domain where the online charging service is subscribed for.

6. The method according to claim 1, wherein the credit control comprises: performing, by a network element in the IMS which performs the credit control, a corresponding control on a current communication of the user when it is determined that a unit of the user in at least one of the CS domain and the IMS has been exhausted.

7. The method according to claim 6, wherein the corresponding control on the current communication of the user comprises: terminating, by the network element in the IMS which performs the credit control, the current communication of the user.

8. The method according to claim 6, wherein when the unit of the user has been exhausted in one of the CS domain and the IMS while has not been exhausted in the other, the corresponding control on the current communication of the user, performed by the network element in the IMS which performs the credit control, comprises, instructing the user to perform a domain transfer to a network domain with a remaining unit to continue the current communication.

9. The method according to claim 8, further comprising instructing, by the network element in the IMS which performs the credit control, the user to perform the domain transfer to the network domain with the remaining unit to continue the current communication through an Unstructured Supplementary Service Data (USSD) message of the CS domain or a Session Initial Protocol Notify (SIP Notify) message of the IMS in accordance with the network domain where the user is currently involved in communication.

10. The method according to claim 6, wherein when the unit of the user remains in a network domain where the user is currently involved in communication while has been exhausted in other network domains, the corresponding control on the current communication of the user performed by the network element in the IMS which performs the credit control comprises, prohibiting, the current communication of the user from being transferred to the network domain with an exhausted unit.

11. The method according to claim 10 further comprising, rejecting, by the network element in the IMS which performs the credit control, a new session establishment request of the user for requesting the domain transfer with a specific reason value via a Call Continuity Control Function (CCCF) entity; or
   instructing, by the network element in the IMS which performs the credit control, the user to prohibit the domain transfer and provide a reason for prohibiting the domain transfer through the USSD of the CS domain or the SIP Notify of the IMS.

12. The method according to claim 1 further comprising, putting, by the network element in the IMS which performs the credit control, at least one of: an indication of the service involving simultaneously the CS domain and the IMS, a current call direction, and the network domain where the user is currently involved in communication, in a reported Credit Control Request.

13. The method according to claim 12 further comprising, determining, by the network element in the IMS which performs the credit control, the current call direction according to information on calling and called users in a session establishment request message; or determining the network domain where the user is currently involved in communication according to at least one of a content of a P-Access-Network-Info header field in the session establishment request message and a subsequent routing decision determined by a domain selection function.

14. The method according to claim 1, wherein the service involving simultaneously the CS domain and the IMS is a Voice Call Continuity (VCC) service; and the method comprises: not invoking the online charging for the user in the CS domain when a CS call originated or terminated by the user is routed to a corresponding Call Continuity Control Function (CCCF) entity for anchoring and performing the credit control for the user in the IMS after anchoring the call of the user to the CCCF entity.

15. The method according to claim 14 further comprising when a domain transfer occurs during a communication of the user, reporting, by a network element in the IMS which performs the credit control, a request for updating the credit control, and instructing at least one of an online charging system (OCS) of the IMS and a prepay system in the CS domain to perform a credit control update.

16. The method according to claim 15, wherein the request for updating the credit control comprises at least one of: a network domain where the user was involved in communication before the domain transfer, and a network domain where the user will be involved in communication after the domain transfer.

17. The method according to claim 16 further comprising determining, by the network element in the IMS which performs the credit control, the network domain where the user was involved in communication before the domain transfer according to a local record, and determining the network domain where the user will be involved in communication after the domain transfer according to the content of the P-Access-Network-Info header field in the session establishment request for requesting the domain transfer.

18. The method according to claim 14 further comprising integrating information originally required for an online credit control and reported information related to a VCC service to calculate a total fee of the user when at least one of the OCS of the IMS and the prepay system in the CS domain performs the credit control.

19. The method according to claim 18, wherein, the information related to the VCC service comprises at least one of: an indication of the VCC service, the current call direction, a network domain where the user is currently involved in communication, a network domain where the user was involved in communication before the domain transfer, and a network domain where the user will be involved in communication after the domain transfer.

20. The method according to claim 14 further comprising, during a routing control for routing the CS call originated or terminated by the user to the CCCF entity for anchoring, controlling putting a specific identification in a Call Detailed Record (CDR) generated in the CS domain and performing, by a network device in the CS domain, a free-charge processing on the CDR generated in the CS domain according to the specific identification, wherein the specific identification comprises at least one of: a specific number of the CCCF entity, a specific prefix inserted before a calling number and free-format charging information issued from a GSM Service Control Function (gsmSCF) to a GSM Service Switching Function (gsmSSF).

21. A method for providing an online charging, comprising:
in a Circuit Switched (CS) domain, not invoking an online charging for a user who subscribes for a service involving simultaneously the CS domain and an IP Multimedia Subsystem (IMS) and needs the online charging, when the user originates or terminates a call in the CS domain; and
in the IMS, performing a credit control for the user when the call of the user is processed in the IMS;
wherein the service involving simultaneously the CS domain and the IMS is a Voice Call Continuity (VCC) service; and the method comprises: not invoking the online charging for the user in the CS domain when a CS call originated or terminated by the user is routed to a corresponding Call Continuity Control Function (CCCF) entity for anchoring and performing the credit control for the user in the IMS after anchoring the call of the user to the CCCF entity.

22. A communication system, comprising:
a circuit switched (CS) domain control device, configured to not invoke an online charging in the CS domain when a user, who subscribes for a service involving simultaneously the CS domain and an IP Multimedia Subsystem (IMS) and an online charging service, originates or terminates a call in the CS domain;
an IMS control device, configured to trigger the interaction for an online credit control in the IMS to perform a credit control when the call is processed in the IMS; and
at least one of an Online Charging System (OCS) of the IMS and a prepay system of the CS domain, configured to perform the credit control for the user in accordance with a Credit Control Request sent from the IMS control device;
wherein the service involving simultaneously the CS domain and the IMS is a Voice Call Continuity (VCC) service; and the communication system is configured to not invoking the online charging for the user in the CS domain when a CS call originated or terminated by the user is routed to a corresponding Call Continuity Control Function (CCCF) entity for anchoring and performing the credit control for the user in the IMS after anchoring the call of the user to the CCCF entity.

23. The method according to claim 21 further comprising when a domain transfer occurs during a communication of the user, reporting, by a network element in the IMS which performs the credit control, a request for updating the credit control, and instructing at least one of an online charging system (OCS) of the IMS and a prepay system in the CS domain to perform a credit control update.

24. The method according to claim 23, wherein the request for updating the credit control comprises at least one of: a network domain where the user was involved in communication before the domain transfer, and a network domain where the user will be involved in communication after the domain transfer.

25. The method according to claim 24 further comprising determining, by the network element in the IMS which performs the credit control, the network domain where the user was involved in communication before the domain transfer according to a local record, and determining the network domain where the user will be involved in communication after the domain transfer according to the content of the P-Access-Network-Info header field in the session establishment request for requesting the domain transfer.

26. The method according to claim 21 further comprising integrating information originally required for an online credit control and reported information related to a VCC service to calculate a total fee of the user when at least one of the OCS of the IMS and the prepay system in the CS domain performs the credit control.

27. The method according to claim 26, wherein, the information related to the VCC service comprises at least one of: an indication of the VCC service, the current call direction, a network domain where the user is currently involved in communication, a network domain where the user was involved in communication before the domain transfer, and a network domain where the user will be involved in communication after the domain transfer.

28. The method according to claim 21 further comprising, during a routing control for routing the CS call originated or terminated by the user to the CCCF entity for anchoring, controlling putting a specific identification in a Call Detailed Record (CDR) generated in the CS domain and performing, by a network device in the CS domain, a free-charge processing on the CDR generated in the CS domain according to the specific identification, wherein the specific identification comprises at least one of: a specific number of the CCCF entity, a specific prefix inserted before a calling number and free-format charging information issued from a GSM Service Control Function (gsmSCF) to a GSM Service Switching Function (gsmSSF).

* * * * *